United States Patent
Spiegel et al.

(10) Patent No.: US 6,298,996 B1
(45) Date of Patent: Oct. 9, 2001

(54) THREE DIMENSIONAL ELECTRODE FOR THE ELECTROLYTIC REMOVAL OF CONTAMINANTS FROM AQUEOUS WASTE STREAMS

(75) Inventors: Ella F. Spiegel, Louisville; Anthony F. Sammells, Boulder, both of CO (US)

(73) Assignee: Eltron Research, Inc., Boulder, CO (US)

( * ) Notice: Subject to any disclaimer, the term of this patent is extended or adjusted under 35 U.S.C. 154(b) by 0 days.

(21) Appl. No.: 09/496,557

(22) Filed: Feb. 2, 2000

Related U.S. Application Data

(60) Provisional application No. 60/118,735, filed on Feb. 5, 1999.

(51) Int. Cl.⁷ .................................................. C02F 1/461
(52) U.S. Cl. ......................... 207/754; 205/755; 205/771; 205/772
(58) Field of Search ................................ 205/754, 755, 205/771, 772

(56) References Cited

U.S. PATENT DOCUMENTS 5,565,107 * 10/1996 Campen et al. ..................... 205/754

OTHER PUBLICATIONS

Mathur and Epstein, *Spouted Beds* Academic Press, New York, N.Y. 1974.

Verma, A. et al. publication draft of "Spouted Bed Electrowinning of Zinc" Accepted by *Metallurgical Transactions B*, Jan. 1996. Published 1997 *Metallurgical Transactions B* p. 69.

* cited by examiner

*Primary Examiner*—Arun S. Phasge
(74) *Attorney, Agent, or Firm*—Greenlee, Winner and Sullivan, P.C.

(57) ABSTRACT

Efficient and cost-effective electrochemical devices and processes for the remediation of aqueous waste streams. The invention provides electrolytic cells having a high surface area spouted electrode for removal of heavy metals and oxidation of organics from aqueous environments. Heavy metal ions are reduced, deposited on cathode particles of a spouted bed cathode and removed from solution. Organics are efficiently oxidized at anode particles of a spouted bed anode and removed from solution. The method of this inventions employs an electrochemical cell having an anolyte compartment and a catholyte compartment, separated by a microporous membrane, in and through which compartments anolyte and catholyte, respectively, are circulated. A spouted-bed electrode is employed as the cathode for metal deposition from contaminated aqueous media introduced as catholyte and as the anode for oxidation of organics from contaminated aqueous media introduced as anolyte.

21 Claims, 10 Drawing Sheets

THREE DIMENSIONAL ELECTRODE FOR THE ELECTROLYTIC REMOVAL OF CONTAMINANTS FROM AQUEOUS WASTE STREAMS

CROSS-REFERENCED TO RELATED APPLICATIONS

This application takes priority from U.S. Provisional Patent Application Ser. No. 60/118,735, filed Feb. 5, 1999, which is incorporated by reference in its entirety herein to the extent not inconsistent with the disclosure herein.

STATEMENT REGARDING FEDERALLY SPONSORED RESEARCH OR DEVELOPMENT

This invention was made through US government funding under Department of Energy Grant No. DE-FG03-97ER82363. The United States government has certain rights in this invention.

BACKGROUND OF THE INVENTION

Water contaminated with metals and toxic organics represents a significant threat to human health and safety and to the quality of water supplies and aquatic environments. Clean-up of contaminated groundwater and industrial waste water is very costly. Heavy metal contamination of water arises from a variety of sources including acid mine drainage, industrial activities which generate contaminated waste water, such as electroplating or electrowinning processes, and remediation activities at toxic waste sites. Chromium, lead, copper, zinc and mercury are commonly-reported heavy metal contaminants with nitrate and sulfate being the most commonly reported anion. Heavy metals frequently pose a long-term environmental hazard because they cannot be degraded or readily detoxified. Removal of trace levels of dissolved metals, i.e., levels below about 2000–4000 ppm, to achieve metal levels below about 100 ppm (preferably below 1 ppm) is a particularly difficult and costly problem.

The most common method currently applied to removal of heavy metal ions is chemical precipitation by adding base to the aqueous waste stream. Intrinsic disadvantages of this approach are high costs, large space requirements, multi-step processing, and the production of heavy wet sludge that itself requires disposal. Similar disadvantages apply to other methods, e.g., reverse osmosis, ion exchange, filtration and foam separation, under investigation for removal of trace metals.

Heavy metals can be removed from aqueous media using electrochemical processing to effect reduction of metal ions and deposition of the metals at the cathode:

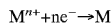
$$M^{n+} + ne^- \rightarrow M$$

where the preferred anodic reaction corresponds to:

$$H_2O \rightarrow \tfrac{1}{2}O_2 + 2H^+ + 2e^-.$$

At high cathodic overpotentials in aqueous solution a parasitic reaction generating hydrogen:

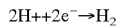
$$2H^+ + 2e^- \rightarrow H_2$$

can occur decreasing the efficiency of the process. The use of conventional electrode configurations, plate and frame electrodes, packed-bed electrodes or static fluidized-bed electrodes, however, have a number of disadvantages. Frame and plate electrodes operating at moderate current densities require larger electrode surfaces and generally require higher operating voltages to achieve desired deposition resulting in high capital and energy costs. Packed-bed electrodes do not accommodate particle growth that occurs on metal deposition leading to interelectrode shorting. Static fluidized-bed electrodes can operate at much higher geometric current density, but inconsistent electrically contact with current collectors can result in low electrochemical efficiency and current collector instability.

Contaminated groundwater and industrial waste water containing toxic organics including aliphatic and aromatic hydrocarbons, halogenated (particularly chlorinated) hydrocarbons, and phenols also represent significant and costly clean-up problems. Again removal of trace levels (about 1000 ppm or less) of toxic organics from water is particularly difficult. Electrochemical processes in which the organic contaminant is oxidized at the anode to decompose the organic and ultimately generate $CO_2$ can be used to remediate contaminated waste water. In this case, the typical concomitant cathode reaction is hydrogen generation. Removal of trace levels of organics using conventional electrode configurations, however, suffers from similar disadvantages including: a low overpotential for oxygen evolution (a competing reaction) and the formation of polymeric films on the electrode surfaces.

The present invention relates to the use of an advanced electrolytic cell technology employing a dynamic spouted electrode for efficient and cost effective removal of trace contaminants (metal ions and organics) commonly found in aqueous waste streams. The spouted electrode cell design has distinct advantages over conventional electrolytic cell technology which include i) lowering mass transfer limitations for trace contaminant remediation, ii) achieving high interelectrode geometric current densities because of the high surface area electrode, iii) cell design which allows convenient removal of electrode particles without cell disassembly, and iv) minimal opportunity for dendritic growth and interelectrode shorting.

The electrode cell design of this invention can utilize readily available, inexpensive materials for fabrication which result in significantly lower capital costs compared to conventional commercial electrolytic hardware. High surface area electrode particles facilitate the efficient removal of trace heavy metals and trace organics and facilitate minimizing electrolytic power consumption.

In particular for heavy metal deposition, the use of high surface area charged metal particles, which in the spouted cathode are in constant motion, avoids dendritic growth and agglomeration of cathode materials as metals are deposited from solution. The spouted cathode cell design of this invention provides the selective, efficient removal of trace heavy metal contaminants from common sources containing mixture of metal ions.

Previous work with spouted cathodes has focused on using the spouted-bed cathode for electrowinning of metals (Salas-Morales, J. C. et al. (1997)Metall.Mater. Trans. B 28B:59; Verma, A. et al. (1997) Metall. Mater. Trans. B 28B:69). U.S. Pat. No. 5,635,051 of Evans reports the use of a spouted cathode for zinc electrowinning. Electrowinning typically employs metal ion solution concentrations in the molar range, very much higher than present in the contaminated aqueous media of this invention. K. B. Mathur and N. Epstein, *Spouted Beds* Academic Press, N.Y., N.Y. 1974 provides general information on spouted bed electrodes.

SUMMARY OF THE INVENTION

This invention provides efficient and cost-effective electrochemical processes for the remediation of aqueous waste streams. Heavy metals and undesirable or toxic organics are removed from contaminated aqueous media employing electrolytic cells having a high surface area spouted electrode. Heavy metal ions are reduced, deposited oil cathode particles of a spouted bed cathode and removed from solution. Organics are efficiently oxidized at anode particles of a spouted bed anode and removed from solution.

The method of this inventions employs an electrochemical cell having an anolyte compartment and a catholyte compartment, separated by a microporous membrane, in and through which compartments anolyte and catholyte, respectively, are circulated. A spouted-bed electrode is employed as the cathode for metal deposition from contaminated aqueous media introduced as catholyte and as the anode for oxidation of organics from contaminated aqueous media introduced as anolyte.

In a spouted-bed electrode, a jet or stream of electrolyte is introduced into the draft tube of the electrode forming the spout. The jet or stream of electrolyte entrains and transports electrode particles in the particle bed up the draft tube after which the particles are released onto the top of the particle bed and ultimately move to the bottom of the bed to be picked up again by the electrolyte stream. The electrode particles are in constant motion moving through the draft tube, and into and through the particle bed during electrolysis. The spouted-bed electrode is a component of an electrolytic cell. The electrolytic cell also has a counter electrode in a separate electrode compartment separated from the spouted-bed electrode by a microporous membrane. A counter electrolyte is circulated in the other electrode compartment in contact with the counter electrode. A voltage is applied across the electrode to effect reduction at the cathode and oxidation at the anode. Electrolysis continues by application of the voltage and circulation of electrolytes, until the desired low level of contaminants is achieved or until spouted-bed electrode operation is disrupted by overloading with deposited material or other loss of efficiency.

In preferred embodiments, the electrolytic cell of this invention is provided with access into the spouted-bed electrode particle bed to remove and replace electrode particles that have become too heavily coated with deposited metal (or organic film) or which are otherwise diminished in function. The access is preferably provided at the draft tube near the bottom of the bed.

A flat rectangular spouted electrode design is preferred for the applications of this invention.

For trace metal deposition, cathode particles can be carbon or metal, particularly the metal (or one of the metals) which is to be deposited. Copper ions, zinc ions and lead ions are efficiently removed from aqueous sulfate and nitrate solutions employing carbon or copper particles.

For oxidation of organics, anode particles can be carbon particles, or metal or ceramic particles or spheres coated with oxidation catalyst, such as doped tin oxide catalysts, particularly Sb-doped tin oxide. Suitable anode particles include titanium spheres coated with an metal oxide oxidation catalyst, such as Sb-doped $SnO_2$.

In generally, electrode particles preferred for use in the method of this invention range in size from about 0.1 mm to about 3 mm.

BRIEF DESCRIPTION OF THE DRAWINGS

FIG. 2A is a side elevation in cross-section illustrating the catholyte compartment of the electrolytic cell.

FIG. 2B is a cross-section of the cell illustrating the two electrode compartments separated by a porous membrane.

DETAILED DESCRIPTION OF THE INVENTION

The invention is further described and illustrated in the accompanying drawings where like numbers represent like features.

Figure 1:
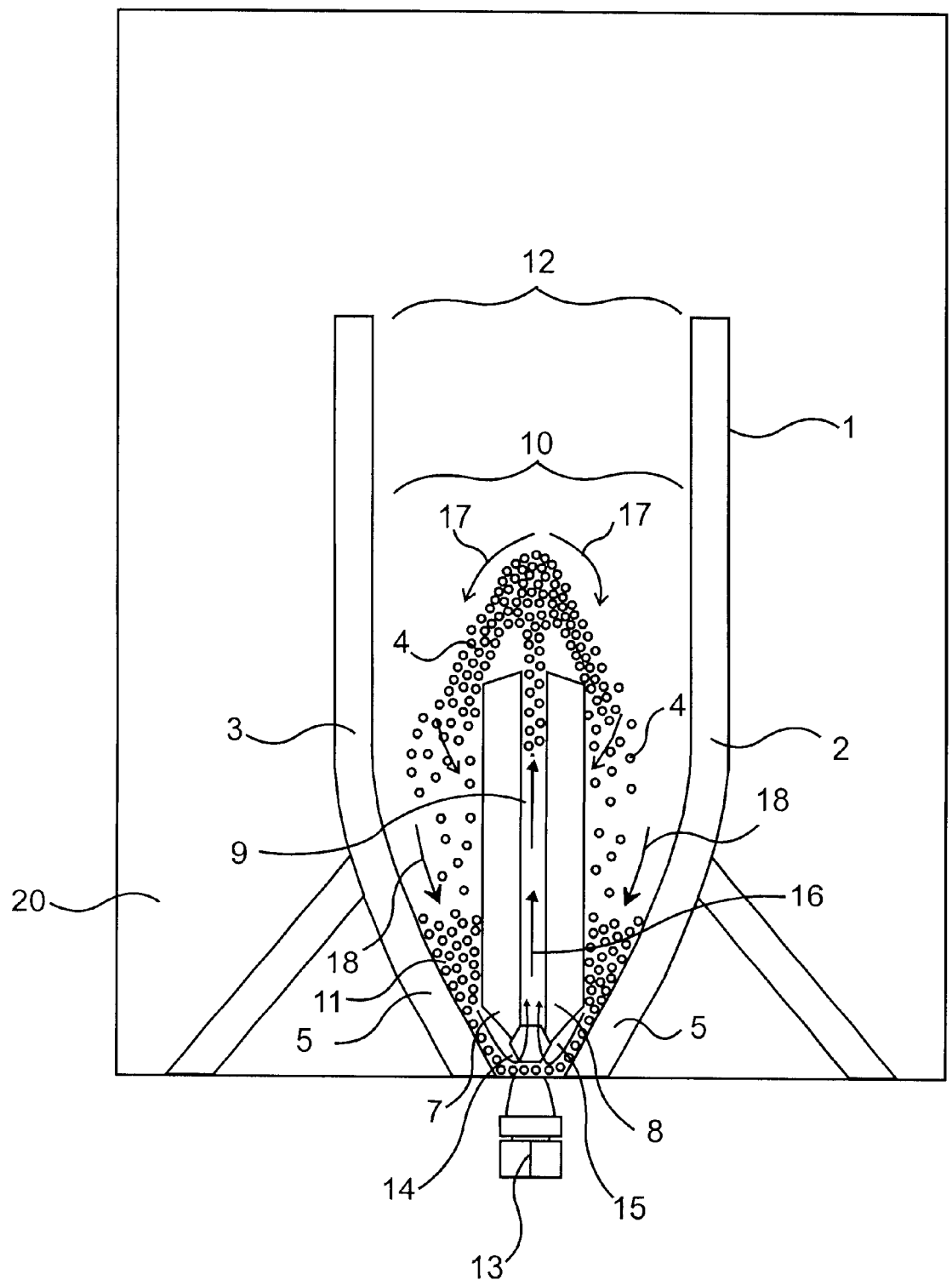
FIG. 1 is a schematic drawing of a side elevation in cross-section of a spouted-bed electrode, illustrating the flow of electrolyte and the movement of particles in the electrode.

The device and methods of the present invention employ a spouting- (or spouted-) or a moving particle-bed electrode. A spouted-bed electrode is schematically illustrated in FIG. 1 as a side-elevation in cross-section. The electrode 10 has a particle bed 11 containing electrode particles 4 filing a portion of the volume within particle retainer 1. The particle retainer has side walls 2 and 3 extending the depth of the electrode compartment which taper to form a conical base 5. The electrode is positioned within an electrode compartment 20 (either anolyte or catholyte) and the front and back walls of the particle retainer are the front substrate and membrane of the electrochemical cell (not shown in the figure). The top (12) of the particle retainer is open (or partially open) to allow electrolyte to circulate and any gases formed during electrolysis to exit. An electrolyte inlet 13 is provided in the electrode compartment on the front face of the particle retainer. There are centrally located walls 7 and 8 within the particle retainer which with the front and back walls form a draft tube (or spout) 9 in fluid communication with opening 13. Opening 13 is illustrated as entering the front of the electrode compartment, but may also be positioned on the front substrate wall. Draft tube 9 does not extend to either the top or the bottom of the particle retainer. Spaces 14 and 15 between the bottom of the draft tube and the particle retainer allow particles 4 from the particle bed to enter the draft tube. The particle bed 11 composed of electrode particles can extend to the top of the draft tube when filled with electrode particles.

In operation, a hydrodynamic jet or stream of electrolyte is introduced at opening 13 flowing as indicated by arrows 16 up the draft tube 9. Electrolyte is pumped into the opening into the particle retainer, through the draft tube and out an exit in the electrode compartment The stream of electrolyte, thus created, transports particles 4 up the draft tube as a suspension. As the stream of electrolyte expands above the tube, fluid velocity drops causing electrode particles to fall into the particle retainer (arrows 17) on either side of the draft tube to form the particle bed. The particles carried up the tube to the top of the particle bed progressively mediate to the base of the particle retainer (as indicated by arrows 18) and subsequently are swept up again by the electrolyte jet or stream. The spouted electrode is a dynamically electronically conducting electrode in which electrode particles are continuously circulated in electrolyte. The stream or jet of electrolyte is typically pumped through the draft tube to form the spout of particles. The electrolyte is pumped at sufficient velocity (dependent upon the geometry of the electrode and the size and type of particles) to set the particle bed in motion transporting particles up the draft tube and into the bed.

In this invention the spouted-bed electrode can be employed as a cathode or an. anode in an electrochemical cell dependent upon the types of contaminants that are to be removed from the aqueous solution. The contaminated aqueous solution is employed as the electrolyte jet or stream to transport the particles. When trace metal ions are to be reduced and removed from the electrolyte, the spouted-bed electrode is configured as the cathode and metal plates out of the electrolyte onto the cathode particles. When trace organic contaminants are to be oxidized and removed from the electrolyte, the spouted-bed electrode is configured as the anode. In an embodiment of this invention, an aqueous waste stream contaminated with both trace organics and trace metals can be split into a spouted-bed anode and a spouted-bed cathode to effect trace organic and trace metal removal, respectively.

Current collection is incorporated into the electrode particle retainer to distribute current among individual particles within the bed 11. One or more current collectors are provided (see FIGS. 2A–B) in contact with the particle bed or a portion of the particle bed. Current collector configurations which minimize the distance between individual particles in the bed and the current collectors are preferred. Copper is the preferred material for current collection. Spouted-bed electrodes in which the draft tube is used as a current collector have been described. In the applications of this invention, the use of the draft tube as a current collector is not recommended to avoid potential clogging of the tube by particles sticking to the draft tube walls.

Figure 2A:
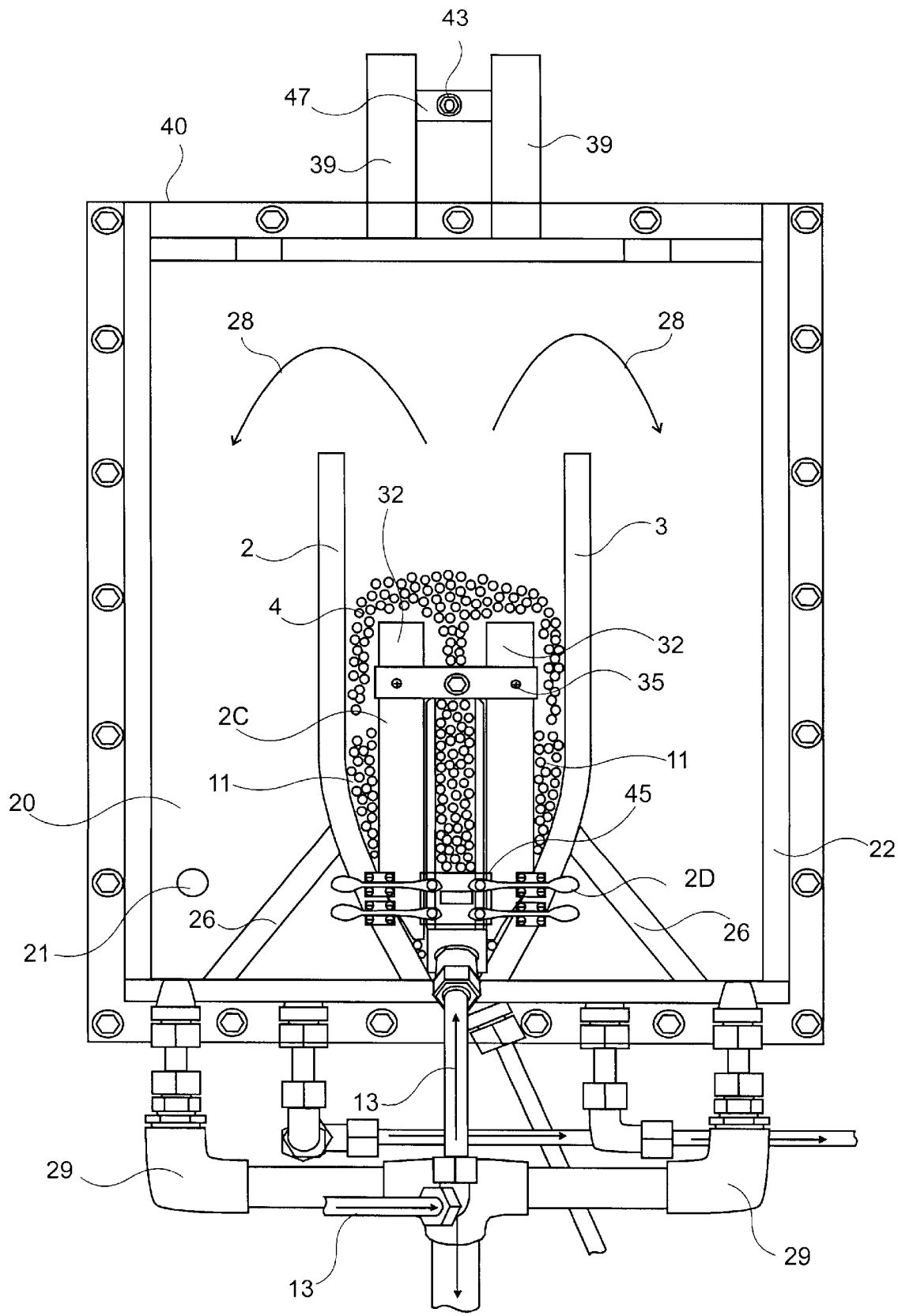
FIGS. 2A and 2B schematically illustrate a flat spouted cathode electrolytic cell.

A side elevation in cross-section of a spouted-bed electrolytic cell adapted for use in trace contaminant removal is schematically illustrated in FIG. 2A. A cross-section of the cell of FIG. 2A is illustrated in FIG. 2B.

Figure 2B:
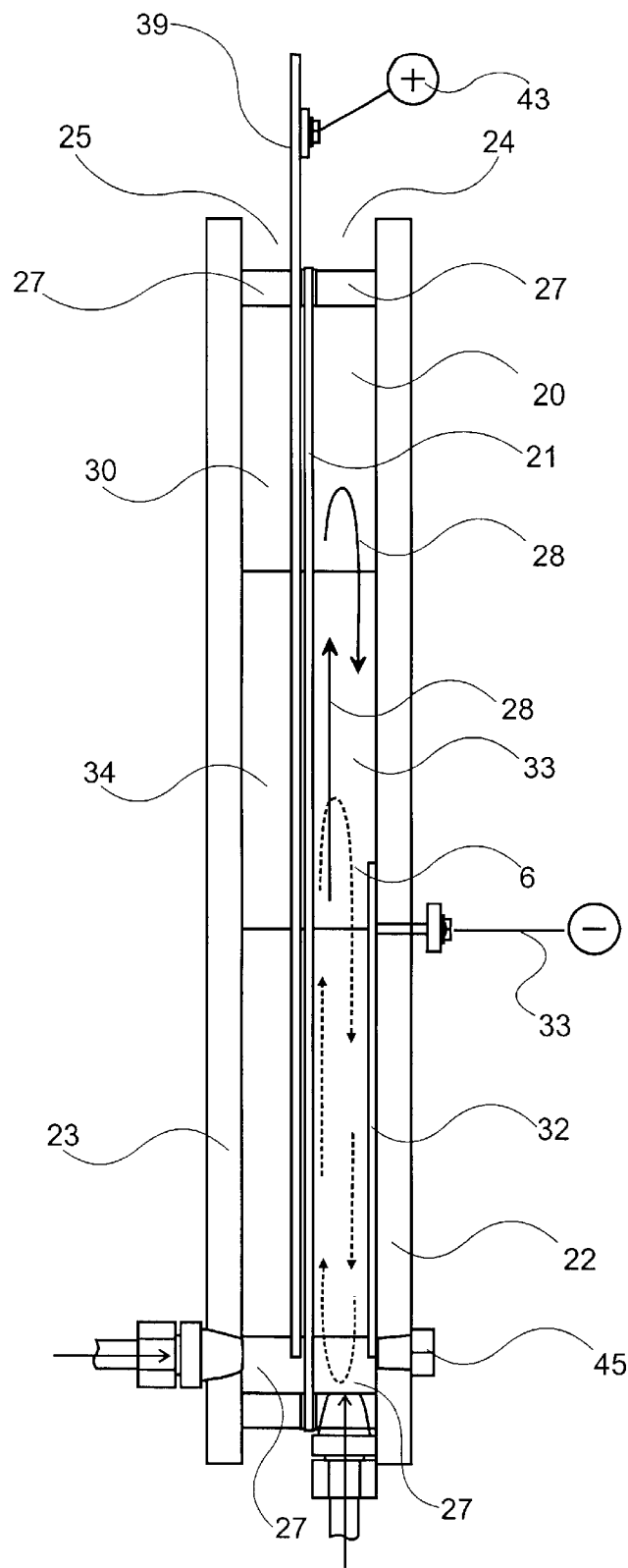

FIGS. 2A and 2B illustrate the electrode compartment of the electrolytic cell 40 which contains the spouted-bed electrode 10 in the cathode compartment (20). This cell is configured for use in removing trace metal ions from aqueous solution. The electrolytic cell has two electrode compartments (a catholyte 20 and an anolyte 30 compartment) separated by a porous membrane 21. The cathode compartment is formed between the membrane and a cathode front wall substrate (22, shown in FIG. 2B). The anode compartment is formed between the porous membrane 21 and the anode front wall substrate 23. Spacers (27) are provided between the front wall substrates and the membrane in each compartment to determine compartment depth. The anolyte compartment and catholyte compartments need not be the same depth. The two compartment cell results when a water-tight seal is provided between the substrates, the spacers and the membrane. The cell substrates, spacers and membrane with appropriately positioned gaskets are layered and sealed by pressure clamping, using clamps, screws, nuts and bolts or similar fastening devices.

The top end of each electrode compartment (24 and 25) is at least partially open to allow access to the electrode compartment and to allow any gases formed to escape. Particle retainer 1 is formed by tapering side walls 2 and 3 positioned between front wall 22 and the ion-porous or ion-permeable membrane 21. Support members 26 (FIG. 2A) can optionally be employed to provide structural support for walls 2 and 3. Draft tube 9 is formed as illustrated in FIG. 1 inside of particle retainer 1. The volume formed between front wall 22, membrane 21, side walls 2 and 3 and the draft tube contains the electrode particles 4. In the illustrated configuration the particles are cathode particles. However, an analogous spouted-bed electrode can be configured as an anode with anode particles.

As discussed above spaces 14 and 15 (FIG. 1) allow particles from the particle bed to enter the draft tube. In operation, a hydrodynamic jet or stream of electrolyte is introduced at opening 13 flowing as indicated by arrows 16 Up draft tube 9. The stream of electrolyte (6), in this case catholyte, transports particles up the draft tube as a suspension. As the stream of electrolyte expands above the tube, fluid velocity drops causing electrode particles to fall back into the particle retainer surrounding the draft tube to form the particle bed. Arrows 28 indicate that catholyte can escape the particle retainer walls to exit the cathode compartment out one or more fluid exits 29 which are in the compartment, but outside of the particle retainer. The particles carried up the tube to the top of the particle bed progressively mediate to the base of the particle retainer and subsequently are swept up again by the catholyte jet or stream. During electrolysis cathode particles are continuously circulated in catholyte.

Figure 2C:
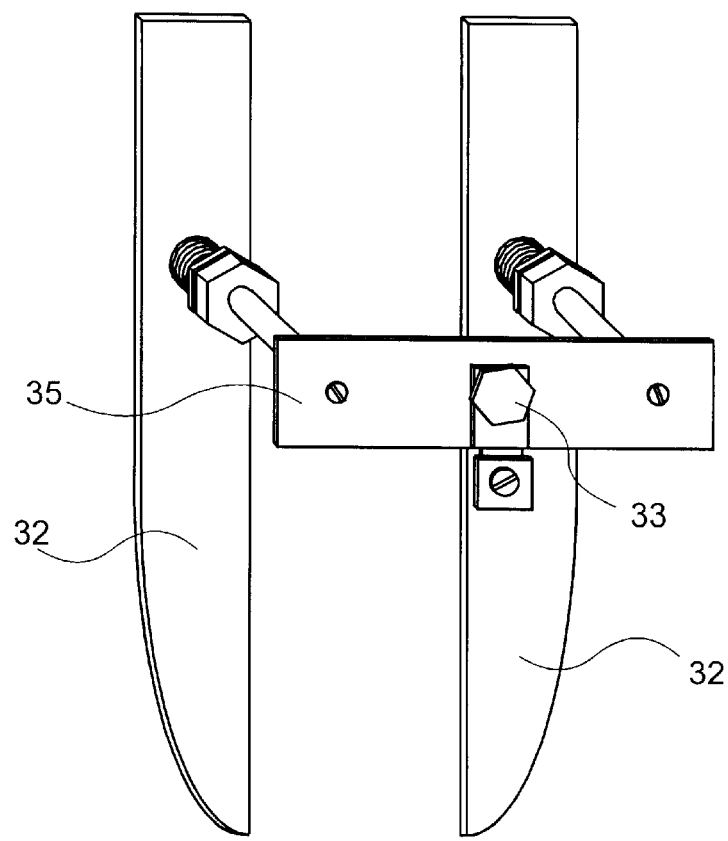
FIG. 2C is an enlarged view of the current collectors of the electrolytic cell of FIG. 2A.

One or more cathode current collectors 32 are positioned in contact with cathode particles in the particle bed. The current collectors of the device of FIG. 2A are illustrated as flat plates at the front wall of the compartment and positioned within the particle retainer in contact with the particle bed. The current collectors are provided with at least one electrical connector 33 (indicated as -) illustrated as extending through the front wall (FIG. 2B). One or more copper bars (35) or a copper plate connect the cathode collectors to provide for equal current distribution. Alternatively, an electrical connector for the current collectors can extend from the connector up and out the top (24) of the cathode compartment. An enlargement in more detail of the current collectors is illustrated in FIG. 2C.

To maximize efficiency of current collection, it is preferred that the cell depth of the compartment (determined by selection of the compartment spacer) containing the spouting-bed electrode be selected to minimize the distance between particles in the bed and the current collectors, yet provide sufficient depth to allow fluid jet formation and minimally inhibit particle circulation.

FIG. 2B illustrates the two electrode compartments of the electrolytic cell each provided with a means for circulating electrolyte (catholyte 33 and anolyte 34) through their respective electrode compartments 20 and 30. The compartments are formed as described above by forming a seal or seals between adjacent layers of a first substrate, a porous membrane and a second substrate with spacers positioned between the membrane and either substrate. Adjacent layers of substrate, spacers and membrane along with gaskets to form seals between the layers are pressure clamped to form the sealed two compartment cell. The pressure seal can be formed using a clamp held together with removable or releasable fasteners, such as nuts and bolts or screws.

Particle movement is illustrated as dotted lines and catholyte flow is illustrated by arrows 28 in the cathode compartment. The anode compartment has an anolyte inlet, an anolyte exit and an anode (39, the counterion to the spouted cathode) in electrically contact with the anolyte. The anode is illustrated in FIGS. 2A and B as comprising two flat metal meshes positioned against membrane 21. The portions of the anode 39 are illustrated as extending up and out of the top of the anode compartment (25) where an electrical connector is provided (43). A copper bar (47) connecting the two portions of the anode provides for current distribution. Alternatively an electrical connector for the anode current collectors can be provided through the front wall of the anode compartment.

The particle bed of the spouted electrode is in electrical contact with the current collectors with the individual electrode particles in the particle retainer are in at least intermittent contact with the current collectors. The particle bed contacts the membrane and the membrane is in turn in contact with the counter electrode.

Figure 2D:
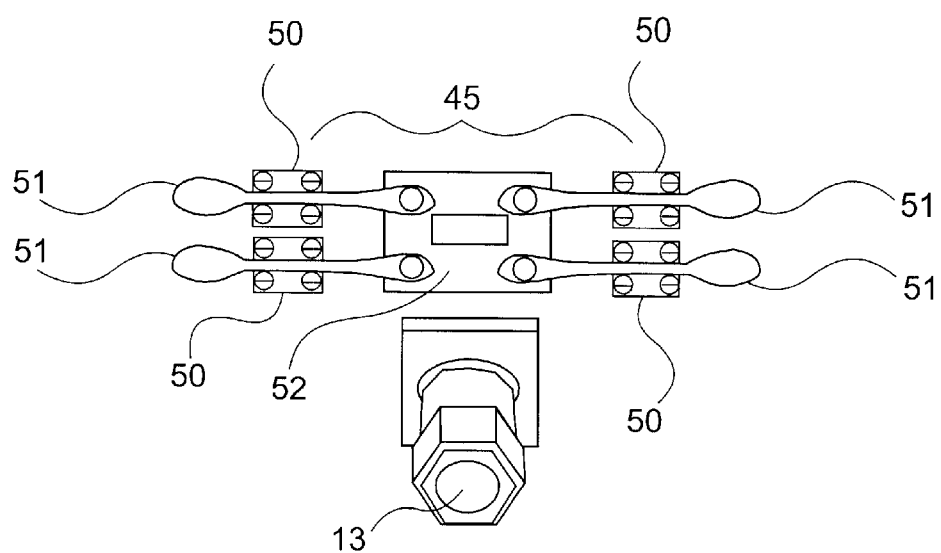
FIG. 2D is an enlarged view of an exemplary access door or port into the particle bed of the spouted-bed electrode of FIG. 2A.

FIG. 2B and the enlargement of FIG. 2D also illustrate an optional, but preferred feature of the electrolytic cells of this invention, an opening 45 positioned to allow external access into the particle retainer and sufficiently large to facilitate removal of electrode particles without dismantling the cell or compartment. The opening can be selectively opened to allow particle removal and closed to retain electrolyte. Any mechanism can be employed for opening and closing this access. Selective access may be provided, for example, through an aperture cut through the front wall of the electrode compartment which is closed with a cover plate held in place with screws or other fastening devices. In FIG. 2D, the access opening 45 is illustrated as a door that is pressure sealed using clamps 50 screwed into the substrate face. These clamps can be released by lifting levers 51. The door 52 has a gasket seal (not shown) to the substrate face. Electrolyte inlet (13) for producing introducing pumped electrolyte to form the spout of the electrode is illustrated in FIG. 2D below the access 45. The access door is preferably positioned at the bottom of the draft tube allowing access to both sides of the particle bed.

Figure 2E:
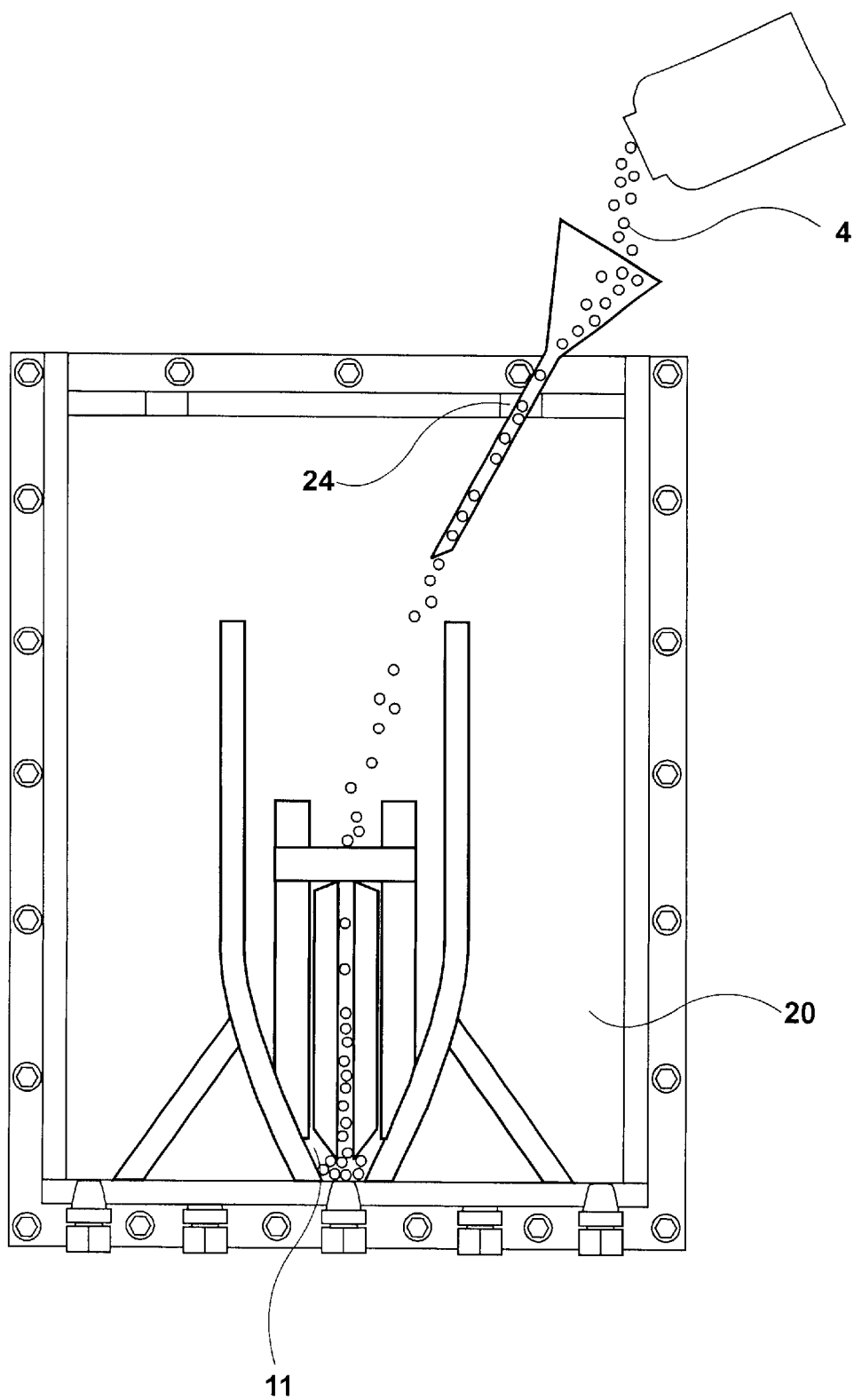
FIG. 2E illustrates introduction of electrode particles into the spouted-bed electrode.
Figure 2F:
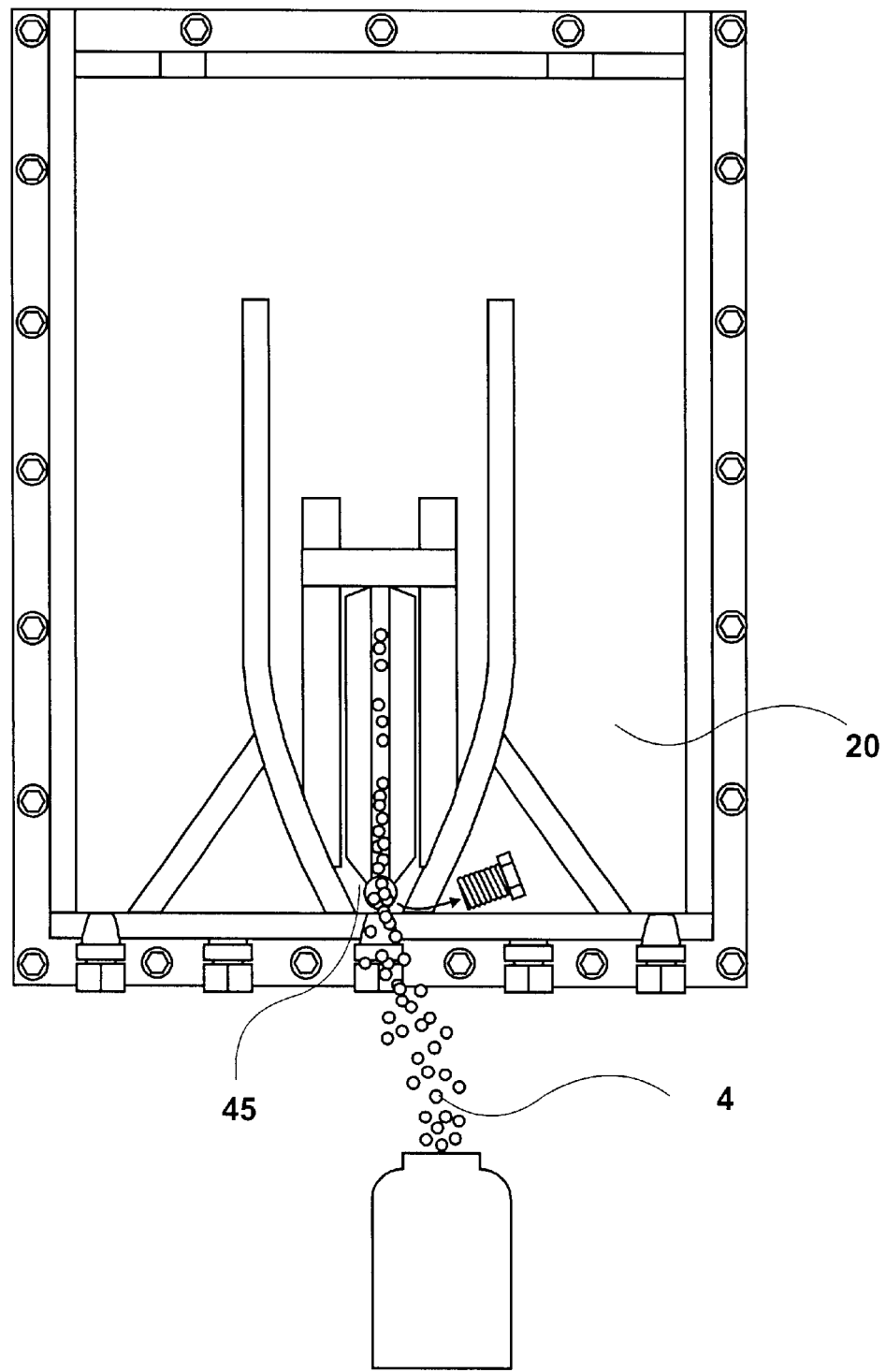
FIG. 2F illustrates access to and removal of electrode particles from the spouted-bed electrode.

FIG. 2E illustrates how particles are introduced into the particle bed (11), preferably through the top opening (24). FIG. 2F illustrates how particles can be accessed and removed from the particle bed through access 45. The features of the electrolytic cells of FIGS. 2E and F are the same as those in FIG. 2A.

Voltage is applied across the anode and cathode of the cell to effect oxidation at the anode and reduction at the cathode. The electrolytic cell is provided with a liquid handling system, pumps, valves, drains, and reservoirs as needed for circulating anolyte and catholyte in their respective compartments. The liquid handling system can be provided with flow meters and flow regulators as desired or needed. The device can optionally be equipped with an emergency shut down system, spill alarms and like safety devices.

In operation, for removal of trace metal ions from aqueous solution, the metal-contaminated solution is employed as catholyte in a cell as illustrated in FIGS. 2A–B. Catholyte is pumped into the catholyte compartment at a rate sufficient to establish transport of cathode particle up the draft tube. Anolyte is circulated through the anolyte compartment. Voltage is applied across the anode and cathode to obtain a desired current density typically about 25 to about 300 mA/cm$^2$ and preferably about 50 to about 100 mA/cm$^2$ in the cells described herein. Voltages applied are preferably about 5 V or less. Lower voltages are preferred for cost efficient operation. Metal ions in the catholyte are reduced, deposited on the cathode particles and removed from solution. Electrolysis is continued until the desired level of removal is achieved or until electrode operation deteriorates due to amount of metal deposited.

In operation, for removal of trace organic contaminants from aqueous solution, the contaminated solution is employed as anolyte in a cell analogous to that illustrated in FIGS. 2A–D, except that the spouted electrode is configured as the anode. Anolyte is pumped into the anolyte compartment at a rate sufficient to establish transport of anode particles up the draft tube. Catholyte is circulated through the catholyte compartment. Voltage is applied across the anode and cathode to obtain a desired current density (typically about 25 to about 300 mA/cm$^2$ and preferably about 50 to about 100 mA/cm$^2$ in the cells described herein). Voltages applied are preferably about 5 V or less. Organics in the anolyte are oxidized and removed from solution. Electrolysis is continued until the desired level of oxidation is achieved.

The spouted-bed electrodes illustrated herein are flat electrodes in flat electrolytic cells. Spouted-bed electrodes have been configured within cylindrical cells as described by Salas-Morales et al. (1997) Metallurgical and Materials Trans. B 28B:59–68. Cylindrical cell configurations can be employed in the methods of this invention, but are not preferred.

Electrochemical deposition of trace heavy metals onto individual cathode particles within a dynamic cathode bed of this invention relies upon interconnected electronic pathways being present between the cathode current collector assembly and the spouting cathode particles. Similarly, oxidation of organics at anode particles within a dynamic anode bed of this invention relies upon interconnected electronic pathways being present between the anode current collector assembly and the spouting anode particles. To maximize contact with particles, the electrode depth is minimized, but sufficiently deep so that particle movement is not inhibited. In a flat rectangular cell design as illustrated in FIGS. 2A and B, the particle bed is shallower in the direction perpendicular to the collector plates and counter electrode than it is in the direction parallel to the collector and counter electrode.

Anodes of the cells of this inventions can be made from any materials known in the art to be suitable for such use, including metals, combinations of metals, metal oxides and dimensionally stable anodes. Anode materials specifically include, but are not limited to iron, lead, nickel, platinum, platinum-iridium, graphite and platinized titanium. Dimensionally stable anodes include titanium coated with a film of rare metal oxides, including iridium oxide, titanium oxide and ruthenium oxide. Anodes can be in the form of flat plates, expanded meshes or any other appropriate shape.

Materials suitable for use as anode particles in spouted anode configurations of this invention include metal and ceramic particles coated with oxidation catalyst and particularly metal or ceramic spheres coated with doped metal oxide catalysts. Titanium spheres coated with Sb-doped $SnO_2$ are suitable anode particles.

Cathodes of the cells of this invention can be made from any materials known in the art to be suitable for such use, including carbon electrodes, metals, combinations of metals, and metal oxides. Cathode materials specifically include, but are not limited to graphite, copper and platinum.

Materials suitable for cathode particles include particles of the metal that is being deposited, particularly copper, and carbon.

Anode and cathode particle size can be adjusted to maximize efficiency of the electrochemical process that is to be conducted.

The porous membrane employed to separate anode and cathode compartments of the electrolytic cell are ion-permeable or ion-porous membranes. The membrane also functions in the cell as a portion of the particle retainer keeping electrode particles within the appropriate compartment and isolating the particles from the counter electrode. Membranes can be made of any material generally known in the art to be suitable for separating the anode and cathode and providing the desired functions. Membrane materials are preferably chemically and electrochemically inert. Further, membrane materials preferably do not release contaminants into the aqueous solutions being remediated. Suitable membrane materials include microporous membranes (made of plastics, such as polyethylene, polypropylene and related polyalkenes and fluorinated polyalkenes) and ion exchange membranes. Proton-conducting polymer membranes, such as NAFION 324 can be used as well. DARAMIC™ (W.R. Grace & Co., Lexington, Mass.) membranes composed of porous polypropylene are particularly useful in the applications of this inventions.

Additives, such as those used in electrowinning processes, may be added to electrolyte to enhance electrolytic cell performance and improve deposition quality on the electrode particles. The formation of hard surfaces of deposited material on electrode particles prevents sticking of the particles to cell surfaces and generally improves cell performance. Additives, such as ammonium chloride, sodium acetate and glucose added to electrolytes can promote the formation of hard surfaces. Organic additives, such as gelatin, animal glue or gum arabic can be added to electrolyte to improve current efficiency. Foam-control agents, such as cresol, cresylic acid and sodium silicate, can be used to minimize foaming in the cell.

Electrolytic cells suitable for use in the methods of this invention have been constructed with interelectrode geometric area in the range of about 75 $cm^2$. Cell fabrication described herein can be readily adapted for the construction of cells having larger interelectrode geometric area (i.e., the surface area of the membrane between the compartments of the cell), up to about 500 $cm^2$ to about 2500 $Cm^2$. Additional scale up can be achieved by stacking of independent cells or providing larger cells having multiple spouted electrodes.

Figure 3:
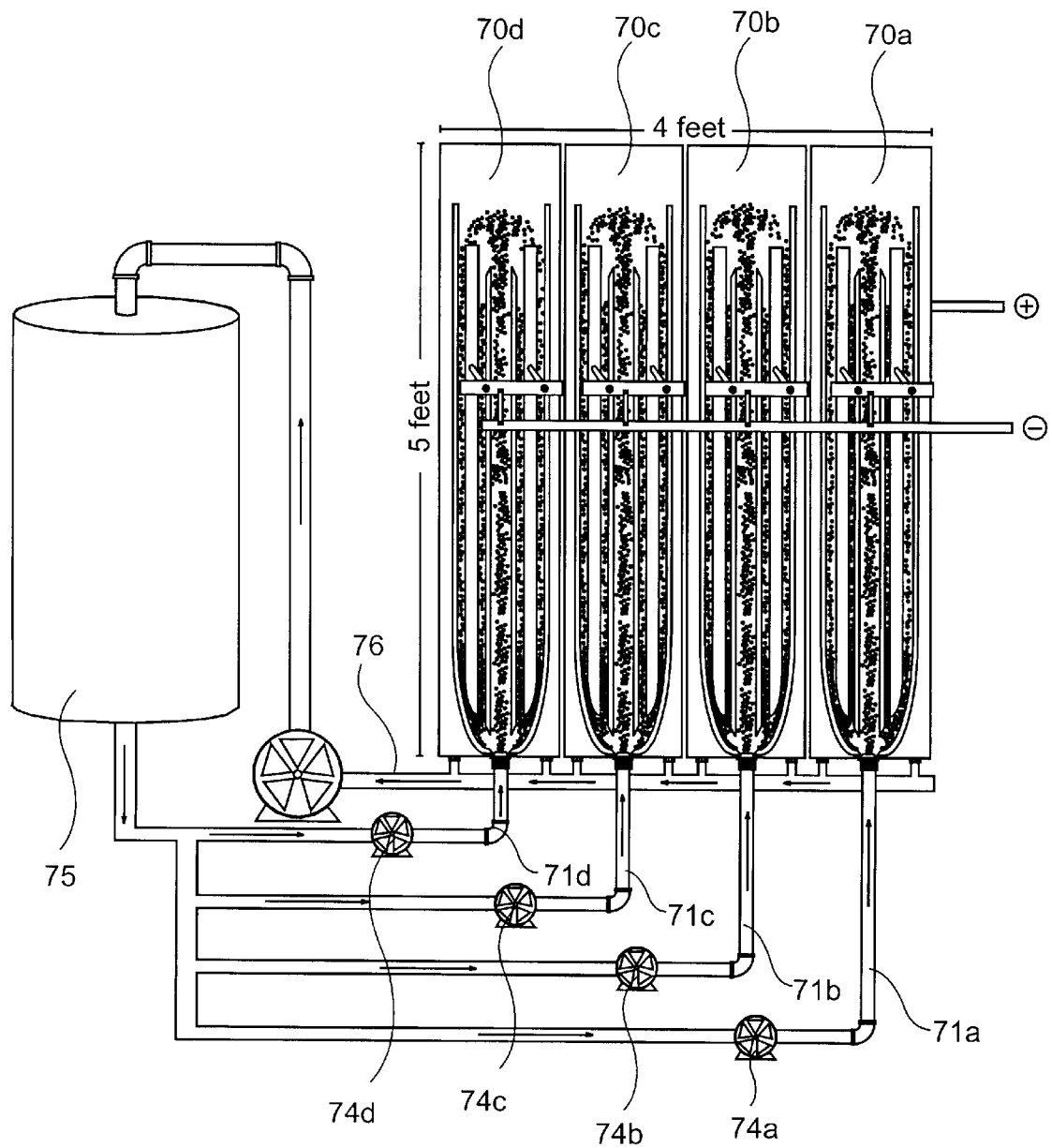
FIG. 3 is a schematic drawing of a multiple spouted-electrode cell device for remediation of contaminated aqueous solutions. The drawing illustrates four independent cells, with independent electrolyte flow (illustrated as catholyte). The device is illustrated in a recirculating mode in which electrolyte is pumped in a parallel manner into the cells and returned to the reservoir. Each cell can be operated independently of the other.

FIG. 3 illustrates and exemplary larger scale multiple spouted-electrode cell system for remediation of contaminated aqueous solutions. The drawing illustrates four independent cells (70a, 70b, 70c and 70d), with independent electrolyte flow (illustrated as catholyte lines) (71a, 71b, 71c and 71d) controlled by valves 74a–d. The device is illustrated in a recirculating mode in which electrolyte is pumped in a parallel manner into the cells and returned through catholyte return 76 to the reservoir 75. Each cell can be operated independently of the other at different voltages, with different anolytes (counter electrolytes) with different cathode and anode particles and at different flow rates. For example, for use in remediating mixed metals, each cell can be configured with components optimized for removal of an individual metal ion (e.g., one cell for copper removal, one or lead removal, etc.). The system can be configured so that one or more of the cells can be shut down at a given time (without interruption of operation of other cells) for particle removal or maintenance.

The multiple cells of the system of FIG. 3 are illustrated as spouting-bed cathodes. All or some of the cells in such a system can be configured as spouting-bed anodes to oxidize organics in aqueous waste stream. A system including both spouting-bed anodes and cathodes in separated cells can be used to simultaneously remove trace organics and trace metals.

The method of this invention is particularly directed to the removal of trace metal and organic contaminants from aqueous media, particularly from aqueous wastes. Trace amounts of metal ions are levels of about 2000–4000 ppm or less, dependent upon the metal ion. The method of this invention is particularly useful for removing a mixture of metals from aqueous media. Mixtures which contain trace amounts of two or more of lead, copper, mercury, zinc and/or chromium can be remediated using the method of this invention. Mixtures which contain about 1000 ppm or less of lead ion ($Pb^{+2}$), about 2000 ppm or less of copper ion ($Cu^{+2}$), about 500 ppm or less of mercury ion ($Hg^{+2}$), about 1000 ppm of less of zinc ion ($Zn^{+2}$), about 1000 ppm or less of chromium ion ($Cr^{+3}$) or mixtures thereof can be remediated by the method of this invention.

The metal removal and deposition method of this invention can combined with known analytical methods for the detection of heavy metal ions to follow metal ion concentration during the course of electrolysis and determine that the concentration of the metal ions has been decreased to desired low levels.

For remediation of water containing trace heavy metals it is preferably to decrease the concentration of individual metal ions to below about 100 ppm and more preferably to below about 1 ppm. For removal of undesirable or toxic organics it is preferred to lower the concentration of the organics as much as possible, to below about 100 ppm and more preferably to below 1 ppm.

Trace amounts of organic contaminants are levels of about 1000 ppm or less. The method of this invention can be applied to remove a variety of industrial organic contaminants, including but not limited to, aliphatic and aromatic hydrocarbons, chlorinated hydrocarbons and chlorinated aromatics, and phenols. The electrolytic oxidation process of this invention can be combined with known analytical methods for the detection of organic contaminants to follow their concentration during the course of electrolysis and determine that the concentration of the organics has been decreased to desired low levels.

The electrochemical cells of this invention are preferably operated under conditions which minimize formation of hydrogen at the spouted-bed cathode or minimize oxygen evolution at the spouted-bed anode. Gas or bubble formation in the particle bed can lead to disruptions in particle movement which result in losses in efficiency.

The electrochemical cells of this invention are typically operated at ambient temperatures. However, if necessary or desirable in a particular configuration may be operated above ambient temperatures by use of conventional heating devices or may be operated below ambient temperature by use of conventional cooling devices.

The spouted cathode achieves higher electrochemical efficiencies for trace metals removal, at least in part, because of lowering mass transfer effects to the metal deposition site. This is due to the presence of a flowing catholyte and the locally low current density at a given electrochemical reduction site within the spouted electrode even though geometric interelectrode current densities are high. This later feature can dramatically lower overpotential losses at the cathode thereby leading to both lower cell operating voltages and decreased opportunity for hydrogen formation. Similar benefits accrue from use of a spouted-bed anode for oxidation of organics.

The following examples are provided to illustrate the invention and are not intended to limit the scope of the invention.

EXAMPLES

The electrolytic cell used in the examples described herein was a flat spouted cathode electrolytic cell having a geometry as illustrated in FIGS. 2A–B with a geometric interelectrode area of about 75 cm$^2$ as dictated by the membrane separator used between compartments. The substrate walls of the cell were rectangular PLEXIGLASS™ sheets. Compartment spacers were also formed from 0.5 inch thick PLEXIGLASS™. An opening was machined in the substrate wall at the bottom of the draft tube of the spouted electrode to allow removal of the electrode particles. The opening has a removable cover providing access to the particles. The side walls of the particle retainer and the walls of the draft tube were formed using strips of 70 durometer silicone rubber (½×⅞ inch)attached to the substrate wall of the cell to form a hydrodynamically compatible channel designed to avoid regions where electrode particles might accumulate and create obstructions to flow or particle motion. The hardness of the silicone rubber employed was selected to provide a balance of flexibility to allow easy formation of the shaped particle retainer walls and to avoid compression and structural distortion when the electrode compartments were formed. A Daramic™ membrane separated the compartments and an expanded dimensionally stable anode (DSA, iridium oxide on titanium mesh) was positioned against the membrane extending up and out of the anolyte compartment. The current collector to the cathode was designed to maximize deposition of metal upon particles rather than the current collectors. Current collectors (copper plates) were positioned geometrically beneath the height achieved by the dynamic cathode bed. Deposition of metals on the current collector was found to be minimal in operation of the cell. IrO$_2$-coated expanded titanium mesh (a Dimensionally stable anode) was employed as the anode. The anodes were positioned directly next to the membrane to minimize the interelectrode cell gap and to lower the overall electrolytic cell voltage during passage of current. The anode was connected to a copper bar to distribute the current applied evenly during the electrolysis. Similarly, the current collectors were connected to a copper bar to distribute applied current evenly.

Catholyte and anolyte were transported through the electrolytic cell using magnetic drive pumps (March pumps) having maximum flow rates up to about 14 GPM. Solution flow rate through each electrode compartment was regulated by ball valves at the pump exit. All solution inlets and outlets for the electrolytic cell were machined, tapped and adapted to compression fitting to avoid breaks or leaks due to back pressure in the lines.

Electrolytic cells of this invention have typically been operated at a geometric current density of about 100 mA/cm$^2$, a cell voltage of about 3 V with current efficiencies in the 60% range.

In preliminary experiments it was determined that electrochemical deposition of trace metals at the cathode was mass transport limited and that evolution of hydrogen was a competing cathodic reaction which increased as the dissolved trace metals were depleted.

Removal of Copper (Cu$^{2+}$) in a Sulfate Medium at Copper (1–14 Mesh) Cathode Particles This experiment was carried out using copper cathode particles 1–14 mesh as the spouted cathode particles for promoting the electrochemical removal of copper from acidic copper sulfate containing solution. Catholyte (representing metal-contaminated aqueous solution) composition was 2000 ppm Cu$^{2+}$ (from CuSO$_4$)and the anolyte composition was 0.5M H$_2$SO$_4$. Initial solution volumes are dependent upon cell size and electrolysis time. Anolyte and catholyte were circulated using magnetic drive pumps with catholyte flow rate at 6.7 gal/min and anolyte flow rate 0.9 gal/min. Electrolysis was performed in a batch recirculating system at room temperature. A geometric current density of 100 mA/cm$^2$ and a cell voltage of 2.24 volts, for example, results in 99.6% copper removal at ambient temperature. Use of voltages below about 3 Volts were found to give the highest % (over 99%) removal of copper. Results indicate that electrolyses run at a current density of 100 mA/cm$^2$ prove to be an effective electrochemical route for the removal of trace copper onto the dynamic three dimensional copper cathode. It was found that current efficiency decreases with increasing current density and overall charge passed. Current efficiency also decreased with time due to increasing mass transfer effects due to copper depletion.

The use of uniform 30 mesh copper cathode particles (estimated area about 100 m$^2$) gave similar results. The use of smaller sized particles, when there is no significant difference in process efficiency, is generally preferred since more metal can be plated out before the particles must be replaced.

Figure 4A:
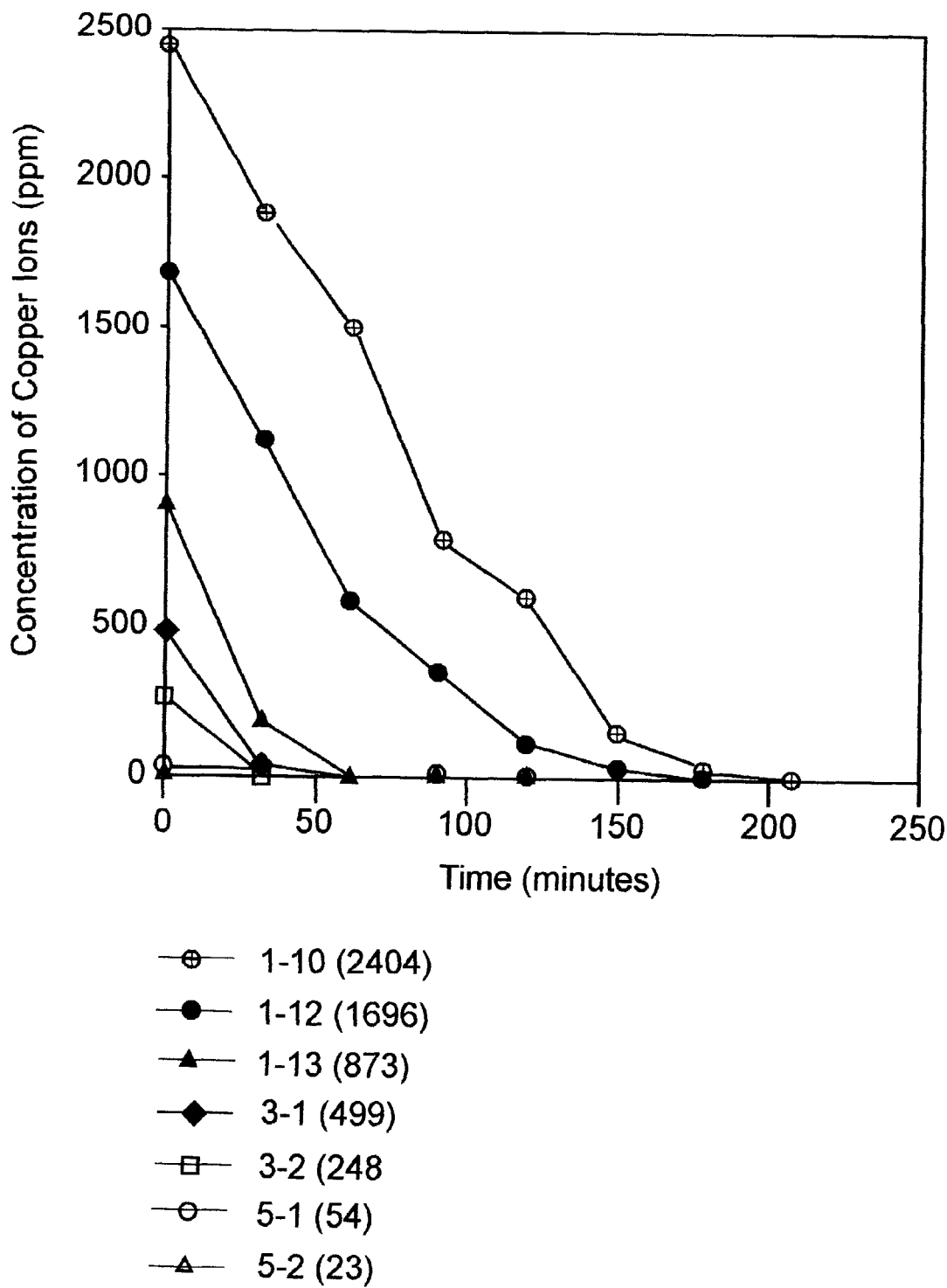
FIGS. 4A and 4B are graphs illustrating the decrease in copper ion and lead ion concentrations, respectively, as a function of time employing the electrochemical method of this invention with a spouted-bed cathode.

FIG. 4A is a graph illustrating the efficiency of copper ion removal as a function of time at different initial copper ion concentrations (2404 ppm to 23 ppm) using a spouted-bed cathode device of this invention. In all cases copper ion concentrations were reduced to below 1 ppm. The cathode particles used were 1.7–3 mm beads at a current density of 50 mA/cm$^2$. Copper ion was provide in as the sulfate and the anolyte was 0.1 M sulfuric acid.

Removal of Copper (Cu$^{2+}$) in a Sulfate Medium at Carbon (2–4 Mesh) Cathode Particles This experiment was carried out using a carbon cathode particle 2–4 mm mesh as the spouted cathode constituents for promoting the electrochemical removal of copper from acidic copper sulfate containing solution. Catholyte composition was 2000 ppm Cu$^2$ (from CUSO$_4$) in 0.1M H$_2$SO$_4$, and anolyte composition was 0.5M H$_2$SO$_4$. Initial solution volumes are dependent upon cell size and electrolysis time. Anolyte and catholyte were circulated using magnetic drive pumps with catholyte flow rate at 3.5 gal/min and anolyte flow rate 0.9 gal/min. A geometric current density of 100 mA/cm$^2$ and a cell voltage of 2.70 volts, for example, resulted in 99.6% copper removal at ambient temperature. Results indicate that electrolyses run at a current density of 100 mA/cm$^2$ and less than 3 Volts prove to be an effective electrochemical route for the removal of trace copper onto the dynamic three dimensional carbon cathode. Efficient copper ion removal could likewise be obtained using small mesh carbon (<1 mm). Percent removal of copper ions was much lower (highest about 42%)in experiments run using nitrate as the anion, rather than sulfate.

Removal of Lead ($Pb^{2+}$) in a Nitrate Medium at Carbon Mesh (2–4 mm) Cathode Particles This experiment was carried out using a carbon cathode particles 2–4 mm mesh as the spouted cathode constituents for promoting the electrochemical removal of lead from acidic lead nitrate containing solution. Catholyte composition was 1000 ppm $Pb^{2+}$ (from $Pb(NO_3)_2$) in 0.1M $HNO_3$ and anolyte composition was 0.5M $H_2SO_4$. Initial solution volumes are dependent upon cell size and electrolysis time. Anolyte and catholyte were circulated using magnetic drive pumps with catholyte flow rate at 3.5 gal/min and anolyte flow rate 0.9 gal/min. A geometric current density of 50 $mA/cm^2$ and a cell voltage of 3.40 volts resulted in 95% lead removal at ambient temperature. Results indicate that electrolyses run at a current density of 50 $mA/cm^2$ prove to be an effective electrochemical route for the removal of trace lead onto the dynamic three dimensional carbon cathode.

The use of lead shot (2 mm size) as the cathode particles resulted in very inefficient lead deposition. It is believed that the inefficiency observed was due at least in part to non-adherence of deposited lead to the soft lead particles and redisolution of lead in the nitric acid media. In contrast, the use of 30 mesh copper gave moderately efficient removal levels (greater than 80% at current densities of 50 $mA/cm^2$).

Figure 4B:
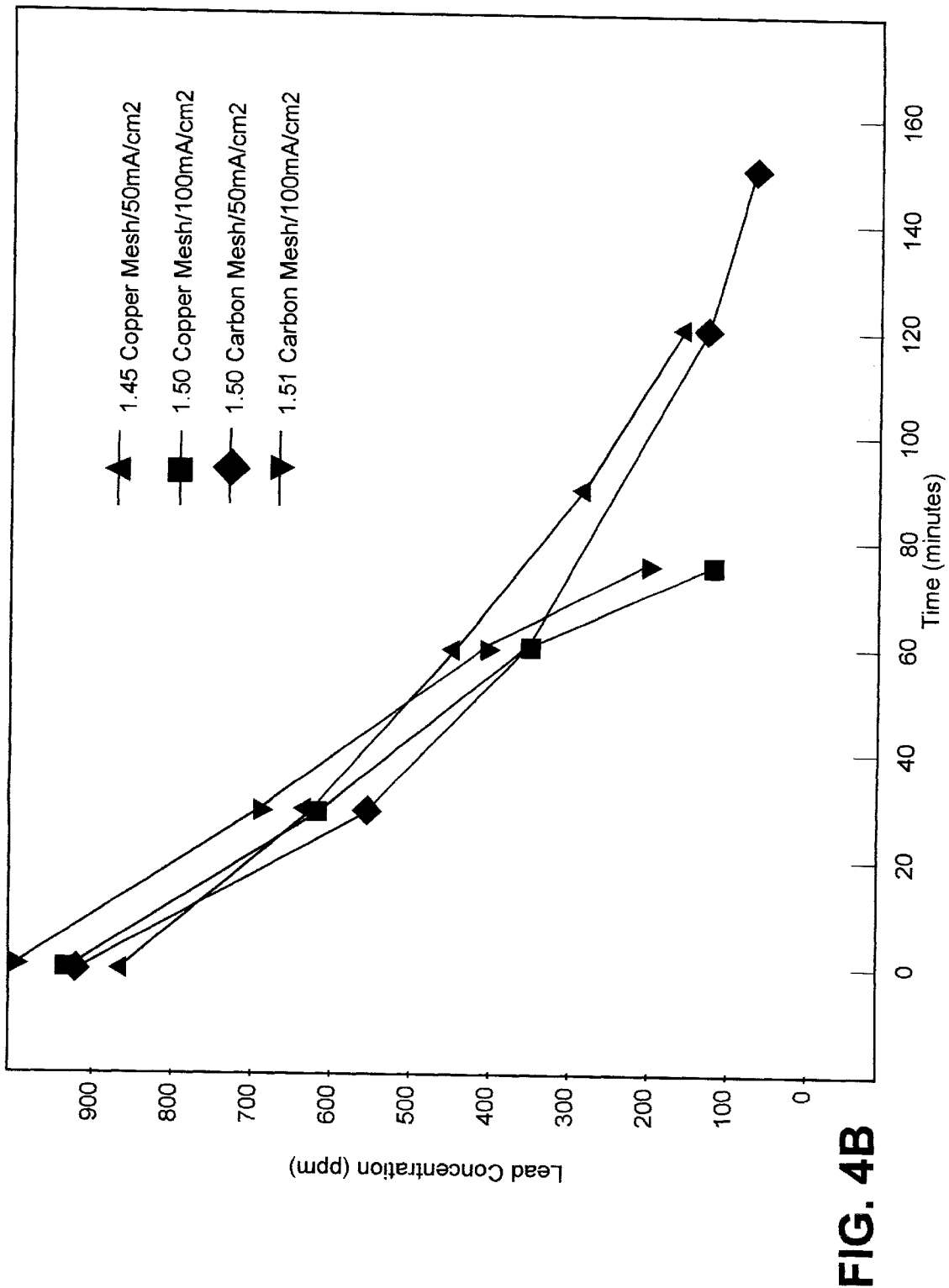

FIG. 4B is a graph illustrating lead ion removal from aqueous nitrate solutions as a function of time using copper mesh or carbon mesh. as cathode particles. The initial lead ion concentration was about 900 ppm. With time, lead ion concentrations were decreased to about 100 ppm or below. Long-Term Performance using a Spouted Copper Particle Cathode for Removal of Copper In the experiments described above, metal ions were typically removed over the course of less than 1 to 3–4 hours (dependent upon initial concentration) using a recirculating batch process. Long-term stability of the electrolytic cells of this invention for use in trace metal deposition was tested using the same electrolytic cell with copper particles for removal of copper ions over 80 or 116 hrs. In long term experiments, the catholyte typically contained about 2,000 ppm $Cu^{2+}$ in 0.1M $H_2SO_4$. Catholyte was replenished every 24 hours to reintroduce copper ions which had become depleted by deposition on the spouted cathode. Anolyte employed was 0.5 M $H_2SO_4$.

Figure 5A:
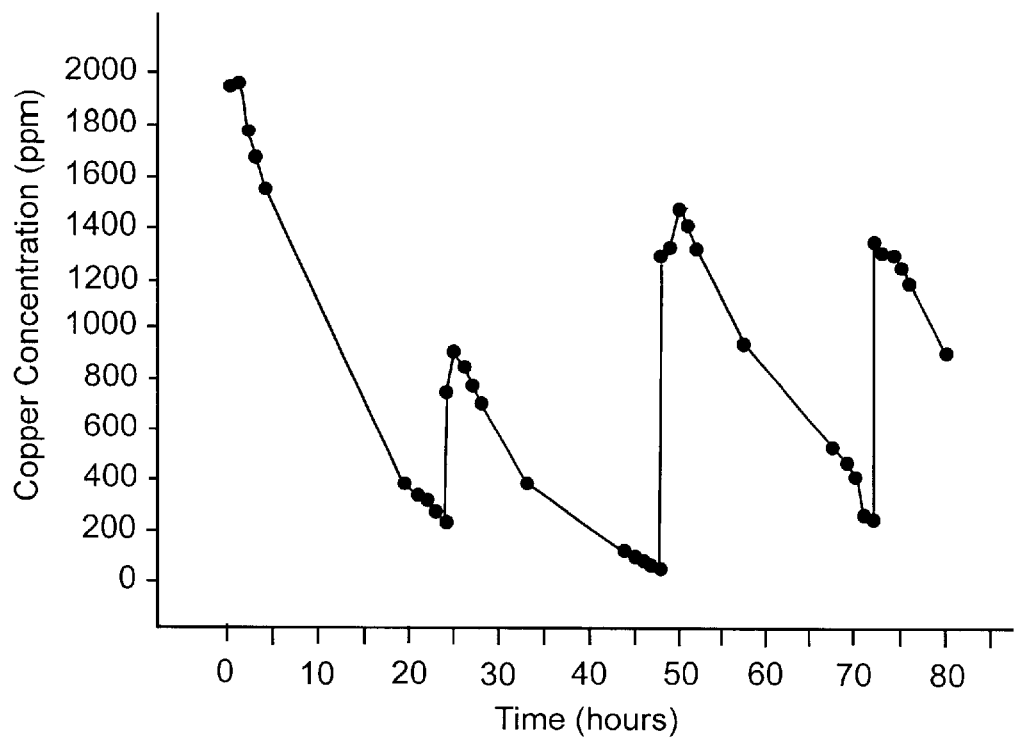
FIGS. 5A and 5B are graphs plotting copper ion concentration in catholyte as a function of time in the long-term (80 and 116 hrs, respectively) electrolytic deposition of copper using copper mesh cathode particles in a spouted-bed electrolytic cell.

In the 80 hr experiment using 30 mesh copper particles, the results of which are illustrated in FIG. 5A where copper concentration in the catholyte is followed as a function of time, an initial geometric current density of 100 $mA/cm^2$ (cell operating voltage 3.55 V) was applied for 21 hrs. Thereafter the current density was 60 $mA/cm^2$ (cell operating voltage less than 3 V). During the latter half of the experiment, operating cell voltages were in the range of about 2.5 to 3.2 V. During electrochemical depletion of copper ions from the solution operating voltage became progressively more cathodic due to the increasing opportunity for parasitic hydrogen generation. Over the course of the experiment, migration of copper ions to the anolyte was analyzed using Atomic Absorption analysis techniques. After the first 24 hours of operation, an average of 30 ppm copper migrated during each 24 hour period. The dimensionally stable anode used in the long-term study did not exhibit any significant deterioration.

Figure 5B:
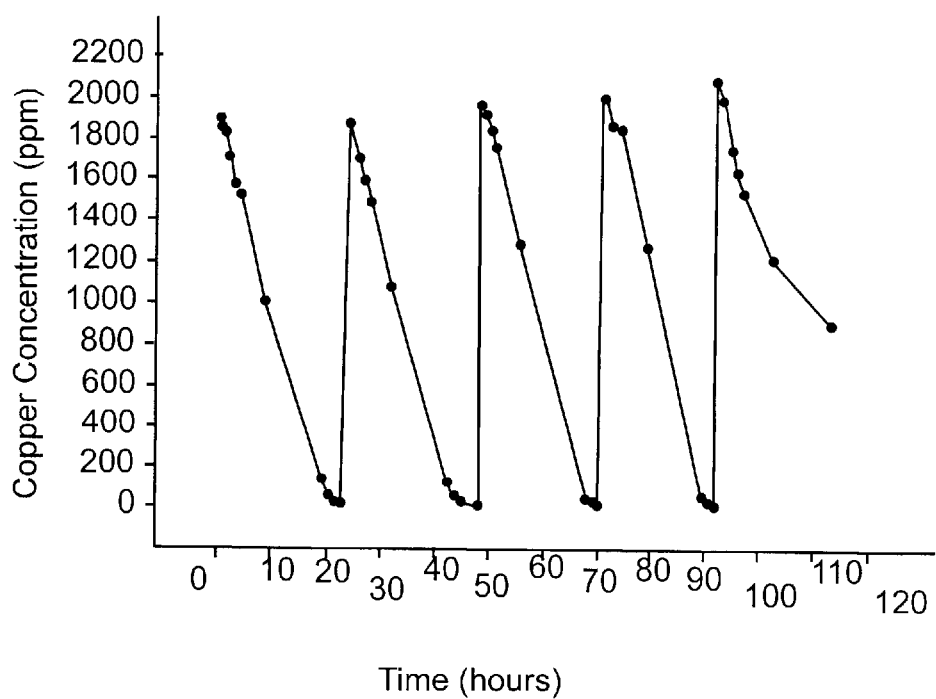

An 116 hr long-term test, the results of which are illustrated in FIG. 5B, was performed in a similar manner, but using 1–4 mesh copper in the spouted cathode. The electrolytic cell was operated at a geometric current density of 100 $mA/cm^2$. As shown in FIG. 5B, dissolved copper was essentially all removed over every 24 hour period after which more dissolved copper was added to the catholyte. The operating cell voltage over the test progressively decreased from 3 to about 1.5 V possibly due to an increase in ionic conductivity of the microporous (DARAMIC™) membrane employed.

Those of ordinary skill in the art will appreciate that materials, media, cell geometries, and component configurations other than those specifically described herein can be employed in the practice of this invention. Functional equivalents of specifically described aspects of this invention that can be readily employed or adapted in the practice of this invention are intended to be encompassed in the scope of the invention.

We claim:

1. A method for removing heavy metal ions from an aqueous solution contaminated with heavy metal ions employing an electrochemical cell which comprises an anolyte compartment comprising a fluid anolyte, and a cathode compartment comprising a fluid catholyte separated by a microporous membrane which comprises the steps of:
   a. circulating a fluid anolyte through said anode compartment which further comprises: an anode in contact with said membrane;
   b. introducing said contaminated aqueous solution as catholyte into said catholyte compartment which further comprises one or more cathode current collectors and a particle retainer containing a spouted-bed cathode having a draft tube and containing a plurality of cathode particles in the particle retainer which is shaped and sized to allow catholyte to exit while retaining cathode particles, said cathode particles in electrical contact with said catholyte, said membrane and at least in intermittent electrical contact with one or more of said cathode collectors; and
   c. circulating said catholyte through said cathode compartment such that catholyte enters through the draft tube of said spouted-bed electrode and exits the cathode compartments at a point outside of said particle retainer; and
   d. applying a voltage across said cathode and said anode; thereby reducing said heavy metal ions in said catholyte and electrochemically depositing the reduced metals on said cathode particles to remove metal ions from said catholyte and thereby remove metal ions from said aqueous solution.

2. The method of claim 1, wherein the cathode particles are carbon cathode particles.

3. The method of claim 1 wherein the cathode particles are transition metal particles.

4. The method of claim 1 wherein the cathode particles are copper particles.

5. The method of claim 1 wherein the anode is a dimensionally stable anode.

6. The method of claim 5 wherein the anode consists of $IrO_2$-based film coated onto a titanium expanded metal mesh.

7. The method of claim 1 wherein the anode is graphite or plantinized titanium.

8. The method of claim 1 wherein the membrane is a microporous polyalkenyl separator.

9. The method of claim 1 wherein the membrane is a microporous polypropylene separator.

10. The method of claim 1 wherein the membrane is an ion-exchange membrane.

11. The method of claim 1 wherein the aqueous solution is contaminated with trace levels of heavy metal ions.

12. The method of claim 1 wherein the aqueous solution is contaminated with chromium, zinc, copper, lead, mercury or mixtures thereof at levels of 4000 ppm or less.

13. The method of claim 1 wherein the electrolysis is run at a current density of about 50 mA/cm$^2$ or more and at a cell voltage of about 8 Volts or less.

14. The method of claim 1 wherein the cathode compartment allows for removal of cathode particle without cell disassembly.

15. The method of claim 1 for removal of trace levels of lead wherein the cathode particles are copper or carbon particles.

16. The method of claim 1 for removal of trace levels of copper wherein the cathode particles are copper or carbon particles.

17. The method of claim 1 for removal of trace levels of zinc wherein the cathode particles are copper or carbon particles.

18. A method for removing undesirable organic compounds from an aqueous solution contaminated therewith employing an electrochemical cell which comprises an catholyte compartment comprising a fluid catholyte, and an anolyte compartment comprising a fluid anolyte separated by a microporous membrane which comprises the steps of:

a. circulating a fluid catholyte through said catholyte compartment which further comprises: an cathode in contact with said membrane;

b. introducing said contaminated aqueous solution as anolyte into said anolyte compartment which further comprises one or more anode current collectors and a particle retainer containing a spouted-bed anode having a draft tube and containing a plurality of anode particles in the particle retainer which is shaped and sized to allow anolyte to exit while retaining anode particles, said anode particles in electrical contact with said anolyte, said membrane and at least in intermittent electrical contact with one or more of said anode collectors; and c. circulating said anolyte through said anode compartment such that anolyte enters through the draft tube of said spouted-bed electrode and exits the anolyte compartment at a point outside of said particle retainer; and d. applying a voltage across said cathode and said anode; thereby oxidizing organics in said anolyte to remove them from said anolyte and thereby remove the organics from said aqueous solution.

19. The method of claim 18 wherein said anode particles are metal or ceramic particles having catalytic film or coatings.

20. The method of claim 18 wherein the anode particles are titanium particles coated with Sb-doped $SnO_2$.

21. The method of claim 18 wherein the cathode is copper.

* * * * *